United States Patent
Thoreau et al.

(10) Patent No.: US 9,135,721 B2
(45) Date of Patent: Sep. 15, 2015

(54) METHOD FOR CODING AND RECONSTRUCTING A PIXEL BLOCK AND CORRESPONDING DEVICES

(75) Inventors: Dominique Thoreau, Cesson Sevigne Cedex (FR); Edouard Francois, Bourg des Comptes (FR); Jerome Vieron, Paris (FR); Aurelie Martin, Paris (FR)

(73) Assignee: THOMSON LICENSING, Issy les Moulineaux (FR)

( * ) Notice: Subject to any disclaimer, the term of this patent is extended or adjusted under 35 U.S.C. 154(b) by 0 days.

(21) Appl. No.: 13/615,314

(22) Filed: Sep. 13, 2012

(65) Prior Publication Data

US 2013/0243336 A1  Sep. 19, 2013

(30) Foreign Application Priority Data

Sep. 13, 2011 (FR) ...................................... 11 58161

(51) Int. Cl.
  *G06K 9/48* (2006.01)
  *G06T 9/00* (2006.01)
  *H04N 19/52* (2014.01)
  *H04N 19/523* (2014.01)

(52) U.S. Cl.
  CPC ........ *G06T 9/00* (2013.01); *H04N 19/52* (2014.11); *H04N 19/523* (2014.11)

(58) Field of Classification Search
  CPC .................. H04N 19/00569; H04N 19/00151; H04N 19/00218; H04N 7/30; G06T 9/004; G06T 9/007; G06F 17/147
  See application file for complete search history.

(56) References Cited

U.S. PATENT DOCUMENTS

2003/0202607 A1* 10/2003 Srinivasan ............... 375/240.29
2004/0252762 A1* 12/2004 Pai et al. .................. 375/240.16

(Continued)

FOREIGN PATENT DOCUMENTS

EP   1734769       12/2006
EP   2346254        7/2011
WO   WO2008149327  12/2008

OTHER PUBLICATIONS

Kaup et al., "On the Performance of the Shape Adaptive DCT in Object-Based Coding of Motion Compensated Difference Images", Sep. 1997, 1997 Picture Coding Symposium, ITG-Fachbericht 143, pp. 653-657.*

(Continued)

*Primary Examiner* — Vu Le
*Assistant Examiner* — Guillermo Rivera-Martinez
(74) *Attorney, Agent, or Firm* — Tutunjian & Bitetto, P.C.

(57) ABSTRACT

A method for coding a block of pixels is described. The coding method comprises:
  determining a prediction block for the pixel block from a motion vector;
  calculating a residue between the pixel block and the prediction block; and
  code the residue.

The determination of the prediction block comprises the following steps:
  determining an intermediate prediction block of size strictly greater than the size of the pixel block;
  transforming the intermediate prediction block into a first block transformed with a first transform; and
  transforming the first transformed block into a second block transformed with a second transform of inverse the first transform whose basis functions are shifted by at least a part of each component of the motion vector, the prediction block being extracted from the second transformed block.

12 Claims, 5 Drawing Sheets

(56) References Cited

U.S. PATENT DOCUMENTS

| | | | |
|---|---|---|---|
| 2005/0254581 A1 | 11/2005 | Iguchi et al. | |
| 2006/0198445 A1 | 9/2006 | Li et al. | |
| 2006/0280252 A1 | 12/2006 | Kwon et al. | |
| 2008/0159393 A1* | 7/2008 | Lee et al. | 375/240.16 |
| 2008/0212676 A1* | 9/2008 | Liu et al. | 375/240.16 |
| 2008/0240245 A1* | 10/2008 | Lee et al. | 375/240.16 |
| 2009/0110075 A1* | 4/2009 | Chen et al. | 375/240.16 |
| 2009/0168887 A1 | 7/2009 | Lin | |
| 2010/0020879 A1* | 1/2010 | Pasquier et al. | 375/240.16 |
| 2010/0061461 A1* | 3/2010 | Bankoski et al. | 375/240.16 |
| 2011/0122950 A1* | 5/2011 | Ji et al. | 375/240.16 |
| 2011/0170594 A1* | 7/2011 | Budagavi et al. | 375/240.13 |
| 2011/0170606 A1* | 7/2011 | Zhang et al. | 375/240.16 |
| 2012/0200669 A1* | 8/2012 | Lai et al. | 348/43 |
| 2012/0201300 A1* | 8/2012 | Kim et al. | 375/240.12 |
| 2012/0281754 A1* | 11/2012 | Sato | 375/240.03 |
| 2013/0129237 A1* | 5/2013 | Yie et al. | 382/233 |
| 2013/0216150 A1* | 8/2013 | Kondo | 382/238 |

OTHER PUBLICATIONS

Tan et al., "Intra Prediction by Template Matching", Oct. 2006, IEEE International Conference on Image Processing, pp. 1693-1696.*

Lan et al., "Intra Frame Coding With Template Matching Prediction and Adaptive Transform", Sep. 2010, Proceedings of 2010 IEEE 17th International Conference on Image Processing, pp. 1221-1224.*

Bossen et al., "Video Coding Using a Simplified Block Structure and Advanced Coding Techniques", Dec. 2010, IEEE Transactions on Circuits and Systems for Video Technology, vol. 20, No. 12, pp. 1667-1675.*

Sullivan J et al: "Video-compression from concepts to the H264/AVC standard". Proceedings of IEEE, IEEE New York, US, vol. 93, No. 1, Jan. 1, 2005, pp. 18-31.

French Search Reported dated May 3, 2012.

Kaup et al., "On the Performance of the Shape Adaptive DCT in Object-Based Coding of Motion Compensated Difference Images", 1997 Picture Coding Symposium, Berlin, Germany, Sep. 10, 1997, pp. 653-657.

Stasinski et al., "Reduced complexity shape adaptive dct for region based image coding", Proceedings of the International Conference on Image Processing, ICIP-98, vol. 3 Chicago, Illinois, USA Oct. 4, 1998, pp. 114-118.

Vatis et al., "Locally adaptive non separable interpolation filter for H264 AVC", Proceedings of the International Conference on Image Processing, ICIP'06, Atlanta, GA, USA, Oct. 8, 2006, pp. 33-36.

Vatis et al., "Two dimensional non separable adaptive wiener interpolation filter for H264 AVC", ITU-Telecommunications Standardization Sector, Study Group 16, Question 6, Video Coding Experts Group (VCEG), 26th Meeting, Busan Korea, Apr. 16, 2005, pp. 1-5.

Wedi, T., "Adaptive interpolation filter for motion compensated hybrid video coding", Picture coding symposium (PCS 2001), Seoul, Korea, Apr. 25, 2001, pp. 1-4.

ISO-IEC FDIS 14496-10: "Text of ISO/IEC FDIS 14496-10: Information Technology—Coding of audio-visual objects—Part 10: Advanced Video Coding", Mar. 31, 2003, pp. 1-270.

Argyriou et al., "A study of sub-pixel motion estimation using phase correlation" Proceedings of the 2006 British Machine Vision Conference, Edinburgh, United Kingdom, Sep. 4, 2006, pp. 1-10.

* cited by examiner

METHOD FOR CODING AND RECONSTRUCTING A PIXEL BLOCK AND CORRESPONDING DEVICES

This application claims the benefit, under 35 U.S.C. §119 of FR Patent Application 1158161, filed 13 Sep. 2011.

1. SCOPE OF THE INVENTION

The invention relates to the general domain of image coding. More precisely, the invention relates to a method for coding a pixel block and a method for reconstructing such a block.

2. PRIOR ART

Video coding devices comprising a motion estimation module capable of estimating motion vectors at a sub-pixel accuracy are known. As an example, the motion estimation module estimates displacements on an interpolated image using interpolation filters at ½, ¼ possibly ⅛ of pixel.

Motion estimation modules using correlators (for example, phase correlation) or global motion estimations which enable motion vectors to be estimated with a sub-pixel accuracy less than ⅛ of pixel are also known.

The usual interpolation filters whose size can be large and whose accuracy can be limited to ⅛ of pixel do not allow an accurate motion compensation when the motion vector from which the motion compensation is made has components at a sub-pixel accuracy less than ⅛ of pixel. Such a usual interpolation filter is described in section 8.4.2.2 of ISO/IEC standard 14496-10 to make the interpolation at ½ pixel.

3. SUMMARY OF THE INVENTION

The purpose of the invention is to overcome at least one of the disadvantages of the prior art. For this purpose, the invention relates to a method for coding a block of pixels comprising the following steps:
 determine a prediction block for the pixel block from a motion vector;
 calculate a residue between the pixel block and the prediction block; and
 code the residue
Advantageously, the determination of the prediction block comprises the following steps:
 determine an intermediate prediction block of size strictly greater than the size of the pixel block;
 transform the intermediate prediction block into a first block transformed with a first transform; and
 transform the first transformed block into a second block transformed with a second inverse transform of the first transform whose basis functions are shifted by at least a part of each component of the motion vector, the prediction block being extracted from the second transformed block.
According to a first embodiment, the intermediate prediction block is determined by adding at least a pixel line and at least a pixel column in the direction of motion to the block obtained by motion compensation of the pixel block from an intermediate motion vector whose components are the integer parts of the components of the motion vector and the basis functions of the second transform are shifted by the fractional parts of the components of the motion vector.
According to a first embodiment, the intermediate prediction block is determined by adding at least a pixel line and at least a pixel column in the direction of motion to a block co-located to the block of pixels to be coded in such a way that the size of the intermediate prediction block is strictly greater than the displacement corresponding to the integer parts of the components of the motion vector and the basis functions of the second transform are shifted by all the components of the motion vector.

According to a particular characteristic of the invention, the size of the intermediate prediction block is a power of 2.

According to another particular characteristic of the invention, the first transform is a 2D discrete cosine transform.

The invention also relates to a pixel block comprising the following steps:
 determine a prediction block for the pixel block from a motion vector;
 decode a residue for the pixel block; and
 reconstruct the pixel block from the prediction block and the residue.
Advantageously, the determination of the prediction block comprises the following steps:
 determine an intermediate prediction block of size strictly greater than the size of the pixel block;
 transform the intermediate prediction block into a first block transformed with a first transform;
 transform the first transformed block into a second block transformed with a second inverse transform of the first transform whose basis functions are shifted by at least a part of each component of the motion vector, the prediction block being extracted from the second transformed block.
The invention further relates to a device for coding a pixel block comprising the following means:
 means to determine a prediction block for the pixel block from a motion vector;
 means to calculate a residue between the pixel block and the prediction block; and
 means to code the residue.
Advantageously, the prediction block determination means comprise the following means:
 means to determine an intermediate prediction block of size strictly greater than the size of the pixel block;
 means to transform the intermediate prediction block into a first block transformed with a first transform;
 means to transform the first transformed block into a second block transformed with a second inverse transform of the first transform whose basis functions are shifted by at least a part of each component of the motion vector; and
 means to extract the prediction block of the second transformed block.
The invention also relates to a device for decoding a stream with a view to the reconstruction of a pixel block comprising the following means:
 means to determine a prediction block for the pixel block from a motion vector;
 means to decode a residue for the pixel block from the stream;
 means to reconstruct the pixel block from the prediction block and the residue;
Advantageously, the prediction block determination means comprise the following means:
 means to determine an intermediate prediction block of size strictly greater than the size of the pixel block;
 means to transform the intermediate prediction block into a first block transformed with a first transform;
 means to transform the first transformed block into a second block transformed with a second inverse transform of the first transform whose basis functions are shifted by at least a part of each component of the motion vector; and
 means to extract the prediction block of the second transformed block.

4. LIST OF FIGURES

The invention will be better understood and illustrated by means of non-restrictive embodiments and advantageous implementations, with reference to the accompanying drawings, wherein.

5. DETAILED DESCRIPTION OF THE INVENTION

Figure 1:
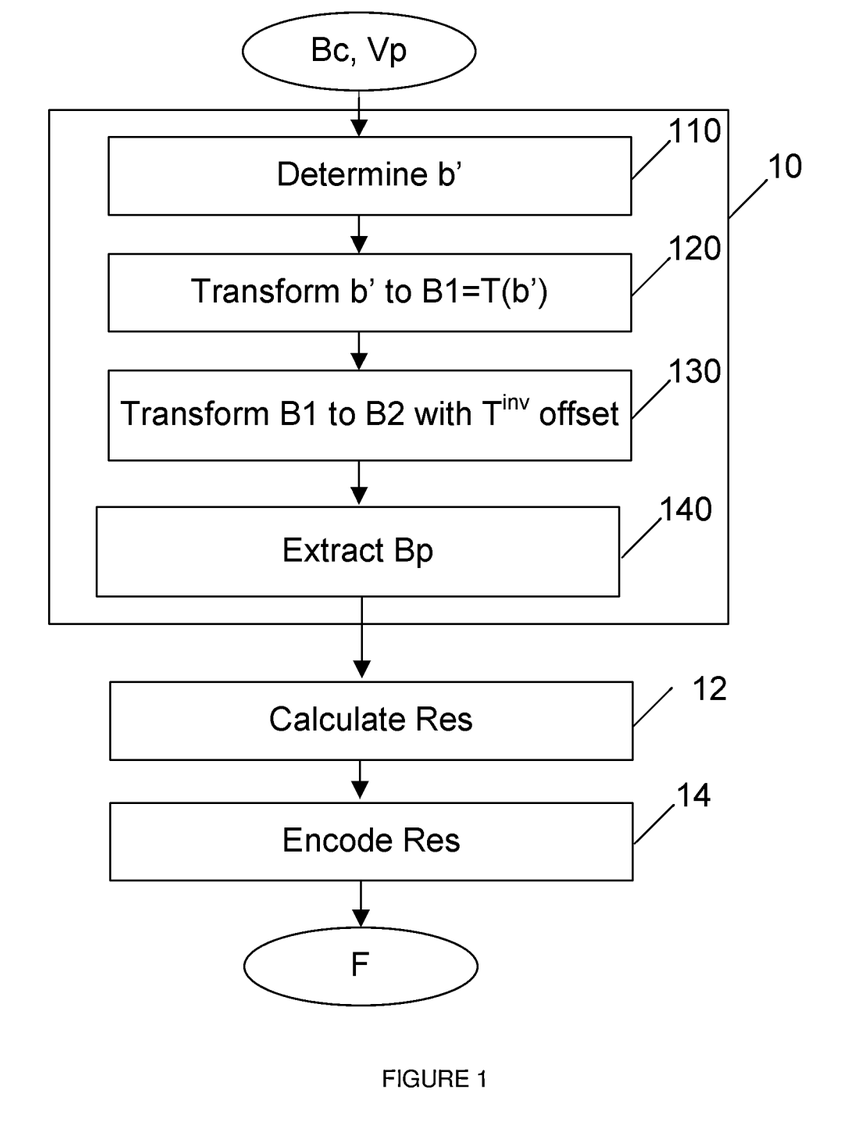
FIG. 1 shows a coding method according to the invention.
Figure 2:
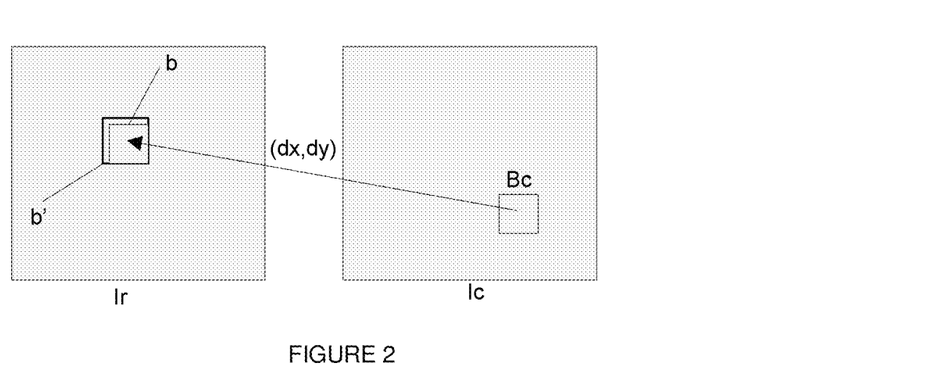
FIGS. 2 and 3 show a block to be coded Bc and an intermediate prediction block b'.

FIG. 1 shows, according to the invention, a method for coding a pixel block Bc of an image Ic, Bc is a block of size M×M with M integer. The pixel block Bc belongs to an image Ic of an image sequence. During a step 10, a prediction block Bp is determined for the pixel block to be coded Bc from a motion vector Vp of components (Vx, Vy) with Vx=dx+$dx_{rs}$ and Vy=dy+$dy_{rs}$, where (dx, dy) are the integer parts of the components and ($dx_{rs}$, $dy_{rs}$) are the fractional parts of the components. For example, if Vx=2.28 then dx=2 and $dx_{rs}$=0.28 and if Vx=−3.73 then dx=−3 and $dx_{rs}$=−0.73. This motion vector Vp associated with the block Bc comes from for example a motion estimation by phase correlation or even an global motion estimation. Vp indicates the displacement of the block Bc between the current image Ic and the reference image Ir. The invention is in no way limited by the method used to obtain the motion vector Vp. The step for determining 10 the prediction block Bp, also known as motion compensation step, comprises, according to a first embodiment represented on FIG. 2, a step 110 for determining an intermediate prediction block b' in a reference image Ir from an intermediate motion vector whose components are the integer parts (dx, dy) of the components of the motion vector Vp as illustrated on FIG. 2. The intermediate prediction block b' comprises block b which is obtained by motion compensation of block Bc from the intermediate motion vector of components (dx, dy). b' is of size N×N, with N strictly greater than M. In a first variant, N=M+1. More precisely, the block b' is obtained by adding to block b at least 1 pixel line and 1 pixel column on 2 of its sides in the direction of displacement/movement as illustrated in FIG. 2. The direction of motion is given by the motion vector Vp. Thus, in FIG. 2, the sub-pixel displacement takes place downwards and to the right in the block b'. Consequently, the block b' is a block increased by 1 pixel line on top and 1 pixel column on the left in relation to block b.

For example, if the block Bc to be coded and therefore the associated prediction block Bp is a block of size 8×8, the intermediate prediction block b' is a block of size 9×9 obtained by adding to block b 1 pixel line and 1 pixel column in the direction of motion as illustrated in FIG. 2.

According to a second embodiment variant, the intermediate prediction block b' is obtained by adding to block b as many pixel lines and columns as necessary on 2 of its sides in the direction of displacement/movement so that N is a power of 2. This variant enables fast transform algorithms to be used. The intermediate prediction block b' is then transformed during a step 120 into a first transformed block B1 with a first transform T of dimension N. T is, for example, a separable DCT ("discrete cosine transform") transform whose basis functions c(i,j) are defined as follows:

$$C = C_{N \times N} = [c(i, j)]_{N \times N} \text{ and } c(i, j) = \alpha(i)\cos\left(\frac{(2j+1)}{2N} \cdot i \cdot \pi\right) \quad (1)$$

$$\text{and } \alpha(i) = \begin{cases} \sqrt{1/N} & i = 0 \\ \sqrt{2/N} & i \neq 0 \end{cases}$$

Consequently, $B1 = [B1(u, v)]_{N \times N} = C \cdot b' \cdot C^T$ \quad (2)

The first transformed block B1 is transformed, during a step 130, into a second transformed block B2 with a second inverse transform of the first transform and whose basis functions are shifted by the fractional parts ($dx_{rs}$, $dy_{rs}$) of the components of the motion vector Vp. The second transform is, for example, an inverse DCT transform whose basis functions are defined as follows:

$$C_{dx} = [c_{dx}(i, j)]_{N \times N} \text{ and} \quad (3)$$
$$c_{dx}(i, j) = \alpha(i)\cos\left(\frac{(2(j - dx_{rs}) + 1)}{2N} \cdot i \cdot \pi\right)$$

$$C_{dy} = [c_{dy}(i, j)]_{N \times N} \text{ and} \quad (4)$$
$$c_{dy}(i, j) = \alpha(j)\cos\left(\frac{(2(i - dy_{rs}) + 1)}{2N} \cdot j \cdot \pi\right)$$

The basis functions are therefore shifted by the fractional parts ($dx_{rs}$, $dy_{rs}$) of the components of the motion vector in the case described with reference to FIG. 2.

Consequently, $B2 = [B2(i,j)]_{N \times N} = C_{dy} \cdot B1 \cdot C_{dx}$. \quad (5)

During a step 140, the prediction block Bp is obtained by extracting from the second transformed block B2 the part corresponding to block b. In the particular case of FIG. 2, the block Bp is obtained by deleting from B2 the first pixel line and the first pixel column.

The intermediate prediction block b' is therefore obtained from block b by adding pixel lines and columns so that the sub-pixel displacements of the image signal inside the intermediate prediction block b' via the inverse transforms (3) and (4) are carried out from the pixels of the intermediate prediction block b' to the pixels of block b (i.e. in the direction opposite to motion).

During a step 12, a residue or residual block is calculated between the pixel block Bc and the prediction block Bp. The residue is generally calculated by differentiating pixel by pixel between the pixel block to be coded Bc and the prediction block Bp determined at step 10. This difference is possibly weighted by taking account of a luminosity variation model.

During a step 14, the residue is coded in a coded data stream. This step generally comprises the transformation, the quantization and the entropy coding of the residue. These steps are well known to those skilled in the art of video coders and are not further described. This step 14 possibly comprises the coding of the motion vector Vp associated with the pixel block to be coded Bc. According to one variant, the motion vector is not coded. For example, the motion vector Vp associated with the pixel block to be coded Bc is determined on the coder and decoder side by the same method of the template matching type.

Figure 3:
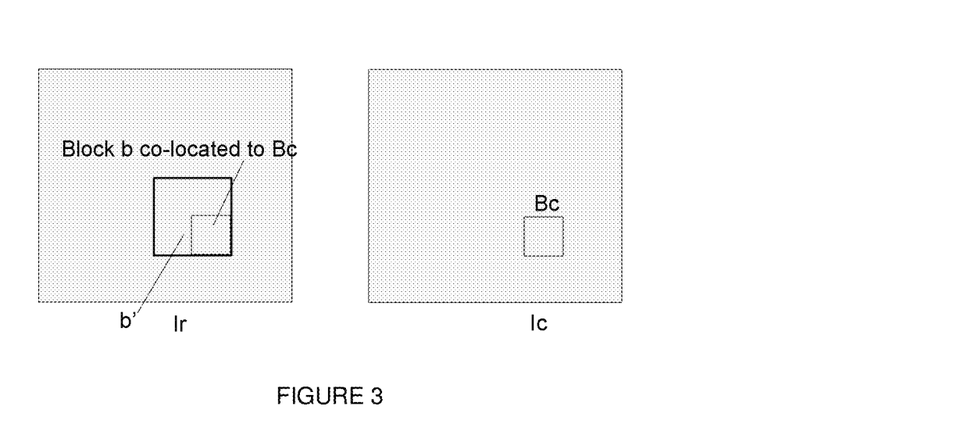

According to a second embodiment, the intermediate prediction block b' determined at step 110 is obtained from block b co-located to block Bc in the image Ir by enlarging it, i.e. by adding one or more pixel lines and columns, in the direction of motion up to a size N×N strictly greater than the displacement corresponding to the integer parts (dx,dy) of the vector Vp, i.e. N>dx and N>dy as illustrated in FIG. 3. This size is for example a power of 2 in order to enable fast transform algorithms to be used.

The intermediate prediction block b' is then transformed during a step 120 into a first transformed block B1 with a first transform T. T is, for example, a separable DCT ("discrete cosine transform"). Consequently, $$B1 = [B1(u,v)]_{N \times N} = C \cdot b' \cdot C^T$$

The first transformed block B1 is transformed, during a step 130, into a second transformed block B2 with a second inverse transform of the first transform whose basis functions are shifted by the integer and fractional parts of the components of the motion vector.

The second transform is, for example, an inverse DCT transform whose basis functions are defined as follows:

$$C_{dx} = [c_{dx}(i,j)]_{N \times N} \text{ and} \quad (7)$$

$$c_{dx}(i,j) = \alpha(i)\cos\left(\frac{(2(j-dx-dx_{rs})+1)}{2N} \cdot i \cdot \pi\right)$$

$$C_{dy} = [c_{dy}(i,j)]_{N \times N} \text{ and} \quad (8)$$

$$c_{dy}(i,j) = \alpha(j)\cos\left(\frac{(2(i-dy-dy_{rs})+1)}{2N} \cdot j \cdot \pi\right)$$

The basis functions are therefore shifted by the components of the motion vector Vp in the case described with reference to FIG. 3.

Consequently, $B2 = [B2(i,j)]_{N \times N} = C_{dy} \cdot B1 \cdot C_{dx}$ (9).

Figure 4:
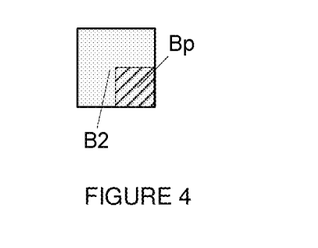
FIG. 4 shows a transformed block B2 and a prediction block Bp.

During a step 140, the prediction block Bp is obtained by extracting from the second transformed block B2 the part corresponding to the co-located block b. In FIG. 4, the block Bp is hatched.

One of the advantages of the coding method according to the invention is that it uses a smaller support than the supports of usual interpolation filters. So, for ¼ pixel interpolation, the usual interpolation filters have a length equal to 6 coefficients. The use of such interpolation filters poses problems on the image edges and necessitates the use of padding techniques. The method according to the invention makes it possible to extricate oneself from this problem. Indeed, on the image edges, the first embodiment with N=M+1 is preferentially used.

Figure 5:
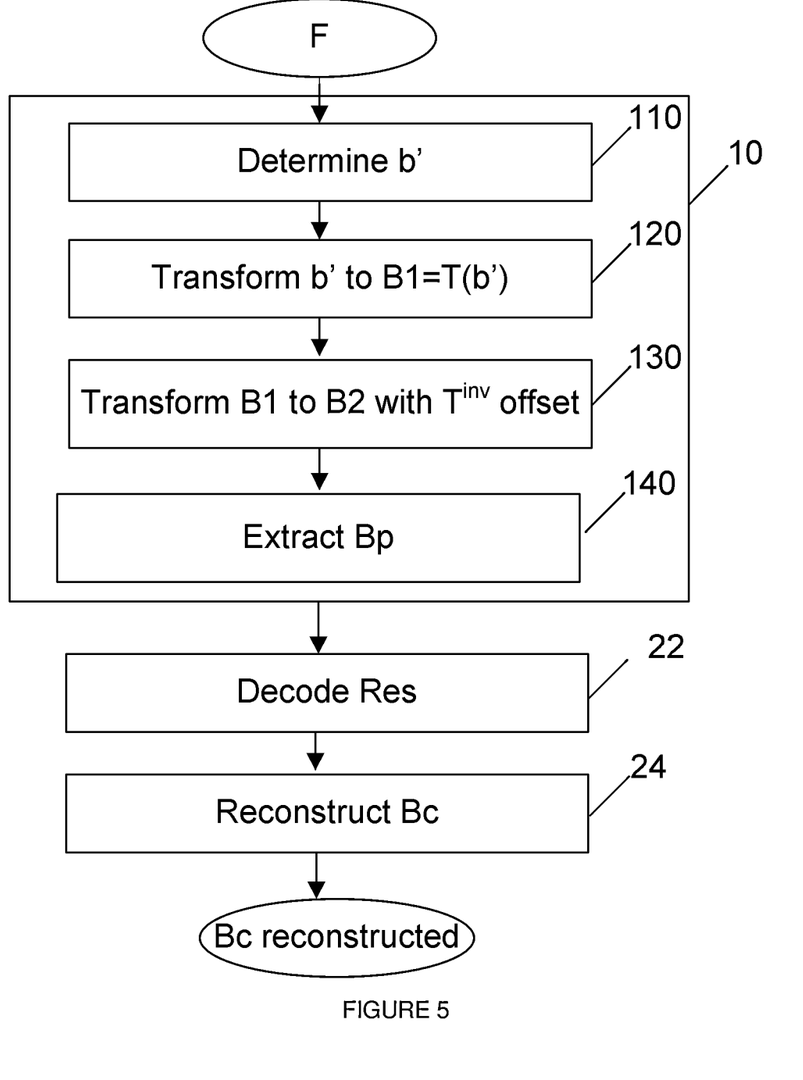
FIG. 5 shows a reconstruction method according to the invention.

FIG. 5 represents according to the invention a method for reconstructing a pixel block Bc from a stream F of coded data. The steps identical to the steps of the coding method are identified in FIG. 5 using the same numerical references and are not further described.

During a step 10, a prediction block is determined for the pixel block to be coded from a motion vector Vp of components (Vx, Vy) with Vx=dx+dx$_{rs}$ and Vy=dy+dy$_{rs}$. This vector comes from for example the decoding of a part of a stream F of coded data. According to one variant, the vector Vp is determined by template matching. Step 10 comprises in particular steps 110, 120, 130 and 140 to determine a prediction block Bp. These steps are identical to those described with reference to FIG. 1 for the coding method. The embodiment variants described for the coding method are also applicable to the decoding method.

During a step 22, a residue is decoded for the block to be reconstructed Bc from the stream F. This step generally comprises the entropy decoding of at least a part of the stream F, the reverse quantization and the inverse transform. These steps are well known to those skilled in the art of video coders and are not further described. These are the inverse steps to those carried out at step 14 of the coding method.

During a step 24, the block Bc is reconstructed from the residue and the prediction block Bp. The block Bc is generally reconstructed by adding up pixel by pixel the residue and the prediction block determined at step 10. This sum is possibly weighted by taking account of a luminosity variation model.

Figure 6:
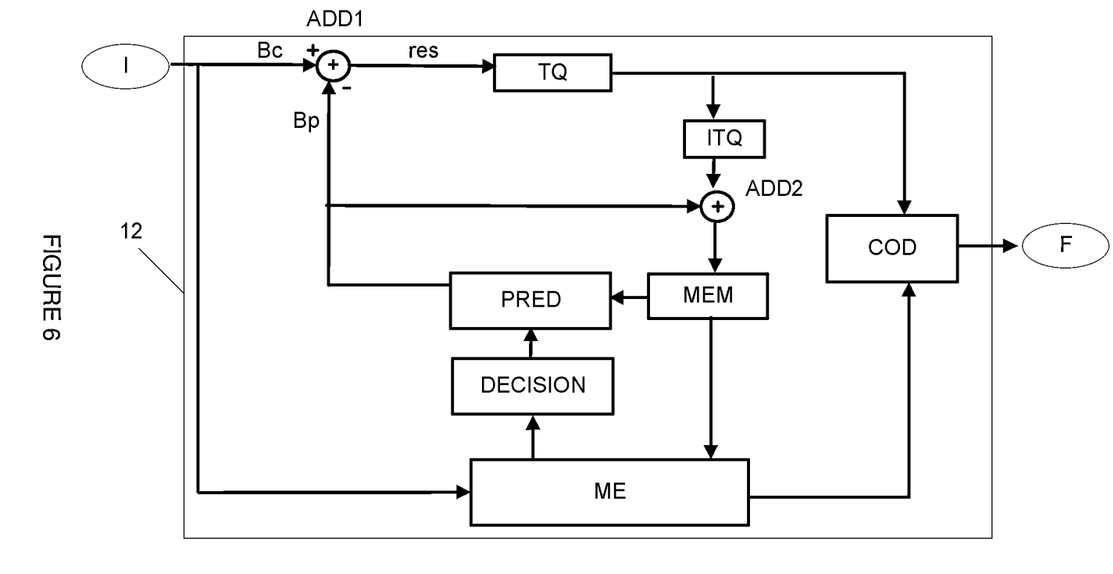
FIG. 6 illustrates a coding device according to the invention.

The invention further relates to a coding device 12 described with reference to FIG. 6 and a decoding device 13 described with reference to FIG. 7. In this figure, the modules shown are functional units that may or may not correspond to physically distinguishable units. For example, these modules or some of them can be grouped together in a single component or circuit, or constitute functions of the same software. On the contrary, some modules may be composed of separate physical entities.

The coding device 12 receives at input images I belonging to a sequence of images. Each picture is divided into blocks of pixels with each of which at least one item of picture data, is associated, e.g. of luminance and/or of chrominance. The coding device 12 notably implements a coding with temporal prediction. Only the modules of the coding device 12 relating to coding by temporal prediction or INTER coding are represented in FIG. 6. Other modules not represented and known to those skilled in the art of video coders implement the INTRA coding with or without spatial prediction. The coding device 12 notably comprises a calculation module ADD1 capable of subtracting pixel by pixel from a current block Bc a prediction block Bp to generate a residue or residual block noted res. It further comprises a module TQ capable of transforming then quantizing the residual block res into quantized data. The transform T is for example a DCT. The coding device 12 further comprises an entropy coding module COD able to code the quantized data into a stream F of coded data. It further comprises a module ITQ carrying out the reverse operation of module TQ. The module ITQ carries out a reverse quantization followed by an inverse transform. The module ITQ is connected to a calculation module ADD2 able to add pixel by pixel the block of data from the module ITQ and the prediction block Bp to generate a block of reconstructed image data that is stored in a memory MEM.

The coding device 12 also comprises a motion estimation module ME able to estimate at least one motion vector Vp between the block Bc and a reference image Ir stored in the memory MEM, this image having previously been coded then reconstructed. According to one variant, the motion estimation can be made between the current block Bc and the source image corresponding to Ir, in which case the memory MEM is not connected to the motion estimation module ME. According to a method well known to those skilled in the art, the motion estimation module searches in the reference image Ir, respectively in the corresponding source image, for a motion vector so as to minimise an error calculated between the current block Bc and a block in the reference image Ir, respectively in the corresponding source image, identified using said motion vector. According to one variant, the motion vector is determined by phase correlation or global motion estimation. The motion data are transmitted by the motion estimation module ME to a decision module DECISION able to select a coding mode for the block Bc in a predefined set of coding modes. The chosen coding mode is for example the one that minimizes a bitrate-distortion type criterion. However, the invention is not restricted to this selection method and the mode chosen can be selected according to another criterion for example an a priori type criterion. The coding mode selected by the decision module DECISION as well as the motion data, for example the motion vector or vectors in the case of the temporal prediction mode or INTER mode are transmitted to a prediction module PRED. The motion vector or vectors and the selected coding mode are moreover transmitted to the entropy coding module COD to be coded in the stream F. If a prediction mode INTER is retained by the decision module DECISION the prediction module PRED then determines in the reference image Ir previously reconstructed and stored in the memory MEM, the prediction block Bp from the motion vector determined by the motion estimation module ME. If a prediction mode INTRA is retained by the decision module DECISION, the prediction module PRED determines in the current image, among the blocks previously coded and stored in the memory MEM, the prediction block Bp.

The prediction module PRED is able to determine the prediction block Bp according to steps 110, 120, 130 and 140 of the coding method described with reference to FIG. 1.

The decoding device 13 is described with reference to FIG. 7. The decoding device 13 receives at input a stream F of coded data representative of a sequence of images. The stream F is for example transmitted by a coding device 12. The decoding device 13 comprises an entropy decoding module DEC able to generate decoded data, for example coding modes and decoded data relating to the content of the images. The decoding device 13 further comprises a motion data reconstruction module. According to a first embodiment, the motion data reconstruction module is the entropic decoding module DEC that decodes a part of the stream F representative of motion vectors.

Figure 7:
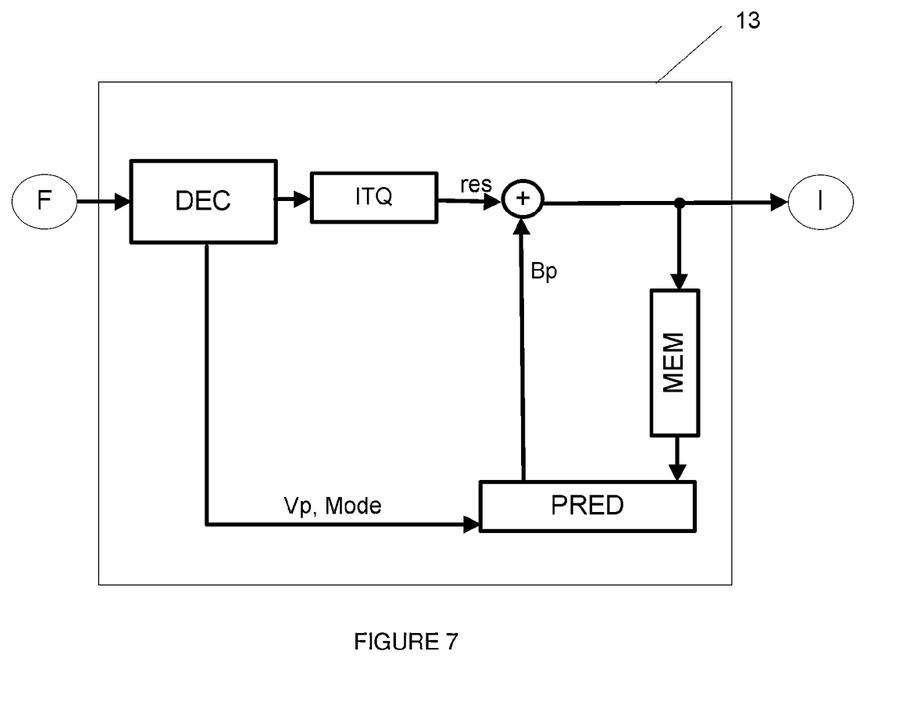
FIG. 7 shows a decoding device according to the invention.

According to a variant not shown in FIG. 7, the motion data reconstruction module is a motion estimation module. This solution for reconstructing motion data by the decoding device 13 is known as "template matching".

The decoded data relating to the content of the pictures is then sent to a module ITQ capable of carrying out a reverse quantization followed by an inverse transformation. The module ITQ is identical to the module ITQ of the coding device 12 having generated the coded stream F. The module ITQ is connected to a calculation module ADD able to add pixel by pixel the block from the module ITQ and a prediction block Bp to generate a block of reconstructed image data that is stored in a memory MEM. The decoding device 13 also comprises a prediction module PRED identical to the prediction module PRED of the coding device 12. If a prediction mode INTER is decoded, the prediction module PRED determines in a reference image Ir previously reconstructed and stored in the memory MEM, the prediction block Bp from the motion vector Vp decoded for the current block Bc by the entropy decoding module DEC. If a prediction mode INTRA is decoded, the prediction module PRED determines in the current image among the blocks previously reconstructed and stored in the memory MEM, the prediction block Bp.

The prediction module PRED is able to determine the prediction block Bp according to steps 110, 120, 130 and 140 of the reconstruction method described with reference to FIG. 5.

The coding and decoding devices according to the invention are for example implemented in various forms of hardware, software, firmware, special purpose processors, or a combination thereof. Preferably, the present principles may be implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) that is executed via the operating system. In addition, various other peripheral devices may be connected to the computer platform such as an additional data storage device and a printing device.

According to variants, the coding and decoding devices according to the invention are implemented according to a purely hardware realisation, for example in the form of a dedicated component (for example in an ASIC (Application Specific Integrated Circuit) or FPGA (Field-Programmable Gate Array) or VLSI (Very Large Scale Integration) or of several electronic components integrated into a device or even in a form of a mix of hardware elements and software elements.

Obviously, the invention is not limited to the embodiments mentioned above.

In particular, those skilled in the art may apply any variant to the stated embodiments and combine them to benefit from their various advantages. In particular, the invention described with the DCT can be applied to other separable or non separable transforms.

In addition, the invention can be applied to any form of blocks, i.e. not rectangular. As previously mentioned, the invention can be applied to other transforms, like shape adaptive transforms of the SADCT type. The SADCT is notably described in the following documents:

Kaup A., Panis S., *On the Performance of the Shape Adaptive DCT in Object-based coding of motion compensated difference Images;* 1997

Stasinski R., Konrad J., *Reduced-complexity shape-adaptive dct for region-based image coding*, USA; 1998

The invention described for a pixel block can be applied to several blocks of an image or even to several blocks of a sequence of several images.

What is claimed is:

1. A method for coding a pixel block comprising:
   determining a prediction block for said pixel block from a motion vector for which each component comprises an integer part and a fractional part;
   calculating a residue between said pixel block and said prediction block; and
   coding said residue, wherein the determination of said prediction block comprises:
     motion compensating said pixel block with an intermediate motion vector whose components are the integer parts of the components of said motion vector;
     determining an intermediate prediction block of size strictly greater than the size of said pixel block by adding at least one line of adjacent pixels and at least one column of adjacent pixels in the direction of motion to said motion compensated pixel block, said direction of motion being given by said motion vector;
     transforming with a first transform said intermediate prediction block into a first transformed block; and
     transforming with a second transform said first transformed block into a second transformed block, wherein said second transform is an inverse transform of said first transform in which said basis functions are shifted by the fractional parts of the components of said motion vector, said prediction block being obtained by deleting said at least one line of adjacent pixels and said at least one column of adjacent pixels from said second transformed block.

2. The method for coding according to claim 1, in which the size of the intermediate prediction block is a power of 2.

3. The method for coding according to claim 1, in which said first transform is a 2D discrete cosine transform.

4. A method for reconstructing a pixel block comprising:
determining a prediction block for said pixel block from a motion vector for which each component comprises an integer part and a fractional part;
decoding a residue for said pixel block; and
reconstructing said pixel block from said prediction block and said residue, wherein the determination of said prediction block comprises:
   motion compensating said pixel block with an intermediate motion vector whose components are the integer parts of the components of said motion vector;
   determining an intermediate prediction block of size strictly greater than the size of said pixel block by adding at least one line of adjacent pixels and at least one column of adjacent pixels in the direction of motion to said motion compensated pixel block, said direction of motion being given by said motion vector;
   transforming with a first transform said intermediate prediction block into a first transform block;
   transforming with a second transform said first transformed block into a second transformed block wherein said second transform is an inverse transform of said first transform in which said basis functions are shifted by the fractional parts of the components of said motion vector, said prediction block being obtained by deleting said at least one line of adjacent pixels and said at least one column of adjacent pixels from said second transformed block.

5. The method for reconstructing a pixel block according to claim 4, in which the size of the intermediate prediction block is a power of 2.

6. The method for reconstructing a pixel block according to claim 4, in which said first transform is a 2D discrete cosine transform.

7. A device for coding a pixel block comprising:
a module to determine a prediction block for said pixel block from a motion vector for which each component comprises an integer part and a fractional part;
a module to calculate a residue between said pixel block and said prediction block; and
a module to code said residue, wherein the determination module of said prediction block comprises:
   a module to motion compensate said pixel block with an intermediate motion vector whose components are the integer parts of the components of said motion vector;
   a module to determine an intermediate prediction block of size strictly greater than the size of said pixel block by adding at least one line of adjacent pixels and at least one column of adjacent pixels in the direction of motion to said motion compensated pixel block, said direction of motion being given by said motion vector;
   a module to transform with a first transform said intermediate prediction block into a first transformed block;
   a module to transform with a second transform said first transformed block into a second transformed block wherein said second transform is an inverse transform of said first transform in which said basis functions are shifted by the fractional parts of the components of said motion vector; and
   a module to extract said prediction block from said second transformed block by deleting said at least one line of adjacent pixels and said at least one column of adjacent pixels from said second transformed block.

8. A device for decoding a stream comprising:
a module to determine a prediction block for a pixel block from a motion vector for which each component comprises an integer part and a fractional part;
a module to decode a residue for said pixel block from said stream; and
a module to reconstruct said pixel block from said prediction block and said residue, wherein the determination module of said prediction block comprises:
   a module to motion compensate said pixel block with an intermediate motion vector whose components are the integer parts of the components of said motion vector;
   a module to determine an intermediate prediction block of size strictly greater than the size of said pixel block by adding at least one line of adjacent pixels and at least one column of adjacent pixels in the direction of motion to said motion compensated pixel block, said direction of motion being given by said motion vector;
   a module to transform with a first transform said intermediate prediction block into a first transformed block;
   a module to transform with a second transform said first transformed block into a second transformed block wherein said second transform is an inverse transform of said first transform in which said basis functions are shifted by the fractional parts of the components of said motion vector; and
   a module to extract said prediction block from said second transformed block by deleting said at least one line of adjacent pixels and said at least one column of adjacent pixels from said second transformed block.

9. The device according to claim 7, wherein the size of the intermediate prediction block is a power of 2.

10. The device for coding according to claim 7, wherein said first transform is a 2D discrete cosine transform.

11. The device according to claim 8, wherein the size of the intermediate prediction block is a power of 2.

12. The device for coding according to claim 8, wherein said first transform is a 2D discrete cosine transform.

* * * * *